United States Patent
Kim et al.

(10) Patent No.: US 10,790,486 B2
(45) Date of Patent: Sep. 29, 2020

(54) SECONDARY BATTERY AND METHOD FOR MANUFACTURING THE SAME

(71) Applicant: LG CHEM, LTD., Seoul (KR)

(72) Inventors: Do Gyun Kim, Daejeon (KR); Je Jun Lee, Daejeon (KR); Kwang Su Hwangbo, Daejeon (KR); Sang Suk Jung, Daejeon (KR); Hang Soo Shin, Daejeon (KR); Gil Young Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 287 days.

(21) Appl. No.: 15/949,324

(22) Filed: Apr. 10, 2018

(65) Prior Publication Data
US 2018/0309096 A1    Oct. 25, 2018

(30) Foreign Application Priority Data
Apr. 25, 2017 (KR) .................. 10-2017-0052973

(51) Int. Cl.
*H01M 2/08* (2006.01)
*H01M 10/04* (2006.01)
(Continued)

(52) U.S. Cl.
CPC ............ *H01M 2/08* (2013.01); *H01M 2/022* (2013.01); *H01M 2/023* (2013.01); *H01M 2/027* (2013.01); *H01M 2/0285* (2013.01); *H01M 2/046* (2013.01); *H01M 2/0413* (2013.01); *H01M 10/049* (2013.01); *H01M 10/0422* (2013.01); *H01M 2/0217* (2013.01); *H01M 2/0473* (2013.01)

(58) Field of Classification Search
CPC ...... H01M 2/08; H01M 2/022; H01M 2/0413; H01M 2/023; H01M 2/027; H01M 2/0285; H01M 2/046; H01M 2/0473; H01M 2/0217; H01M 10/049; H01M 10/0422; B23D 21/00; B23D 21/14
See application file for complete search history.

(56) References Cited

U.S. PATENT DOCUMENTS

| | | | |
|---|---|---|---|
| 2008/0131768 A1* | 6/2008 | Lee | H01M 2/1229 429/174 |
| 2010/0248014 A1 | 9/2010 | Huang et al. | |
| 2019/0103591 A1* | 4/2019 | Funato | H01M 2/0285 |

FOREIGN PATENT DOCUMENTS

| | | |
|---|---|---|
| JP | 9-161736 | * 12/1995 |
| JP | 2008-0131768 | * 12/2006 |

(Continued)

OTHER PUBLICATIONS

Office Action dated Aug. 12, 2019, from the Korean Patent Office in counterpart Korean Application No. 10-2017-0052973.

*Primary Examiner* — Stephen J Yanchuk
(74) *Attorney, Agent, or Firm* — Morgan, Lewis & Bockius LLP (57) ABSTRACT

Provided are a secondary battery that is capable of preventing a can member from corroding and a method for manufacturing the same. The secondary battery includes a can member defining an outer appearance of the secondary battery, a top cap assembly an opening of the can member, a gasket insulating the can member and the top cap assembly from each other, and a fracture part disposed on an inner circumference of the opening. The fracture part is blocked from the outside by the gasket.

5 Claims, 6 Drawing Sheets

(51) Int. Cl.
  *H01M 2/02* (2006.01)
  *H01M 2/04* (2006.01)

(56) References Cited

FOREIGN PATENT DOCUMENTS

| JP | 2010-086781 | * | 4/2010 |
| KR | 10-2010-0036316 A | | 4/2010 |
| KR | 10-2016-0042327 A | | 4/2016 |

* cited by examiner

SECONDARY BATTERY AND METHOD FOR MANUFACTURING THE SAME

CROSS-REFERENCE TO RELATED APPLICATIONS

This application claims the priority of Korean Patent Application No. 10-2017-0052973, filed on Apr. 25, 2017, in the Korean Intellectual Property Office, the disclosure of which is incorporated herein by reference.

BACKGROUND OF THE INVENTION

Field of the Invention

The present invention relates to a secondary battery and a method for manufacturing the same, and more particularly, to a secondary battery that is capable of preventing a can member from corroding and a method for manufacturing the same.

Description of the Related Art

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A non-permeable sealing member for non-aqueous electrochemical cells according to the related art is disclosed in Korean Patent Publication No. 10-2010-0036316.

In the secondary battery according to the related art, when a can member is manufactured, nickel (Ni) plating is broken on a fracture surface of a trim part to expose iron (Fe). Thus, the fracture surface is exposed to the outside to cause corrosion.

SUMMARY OF THE INVENTION

An aspect of the present invention provides a secondary battery that is capable of preventing a trim part of a can member from being exposed to the outside and a method for manufacturing the same.

According to another aspect of the present invention, there is provided a secondary battery including: a can member defining an outer appearance of the secondary battery; a top cap assembly sealing an opening of the can member; a gasket insulating the can member and the top cap assembly from each other; and a fracture part disposed on an inner circumference of the opening, wherein the fracture part is blocked from the outside by the gasket.

The fracture part may be disposed on an end of the can member, and the end of the can member may be bent to the gasket.

The fracture part may be closely attached to the gasket.

The gasket may wrap the fracture part.

The fracture part may be disposed on an end of the opening of the can member, a recess part may be defined in the gasket, and the fracture part may be inserted into the recess part.

According to another aspect of the present invention, there is provided a method for manufacturing a secondary battery, the method including: a preparation step of preparing a can member of the secondary battery; a bending step of bending a cutoff part inward from an opening of the can member; and a cutting step of allowing a trimming mold to pass through the opening and cut the cutoff part so that a fracture part of the opening is formed on an inner circumference of the opening.

The trimming mold may have an outer circumference equal to or less than the inner circumference of the can member.

After the cutting step, an electrolyte and an electrode assembly may be accommodated in the can member.

A top cap assembly may be installed on the opening of the can member in which the electrolyte and the electrode and the electrode assembly are accommodated.

A gasket may be installed between the can member and the top cap assembly to insulate the can member and the top cap assembly from each other.

The gasket may wrap the fracture part to prevent the fracture part from being exposed to the outside.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, a secondary battery and a method for manufacturing the same according to exemplary embodiments of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 1:
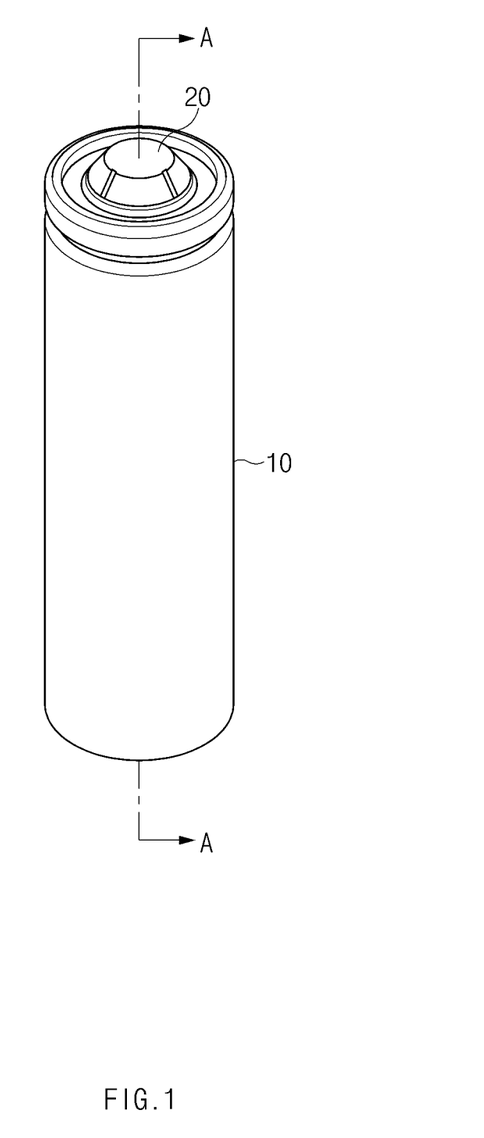
FIG. 1 is a perspective view of a secondary battery according to an embodiment of the present invention.
Figure 2:
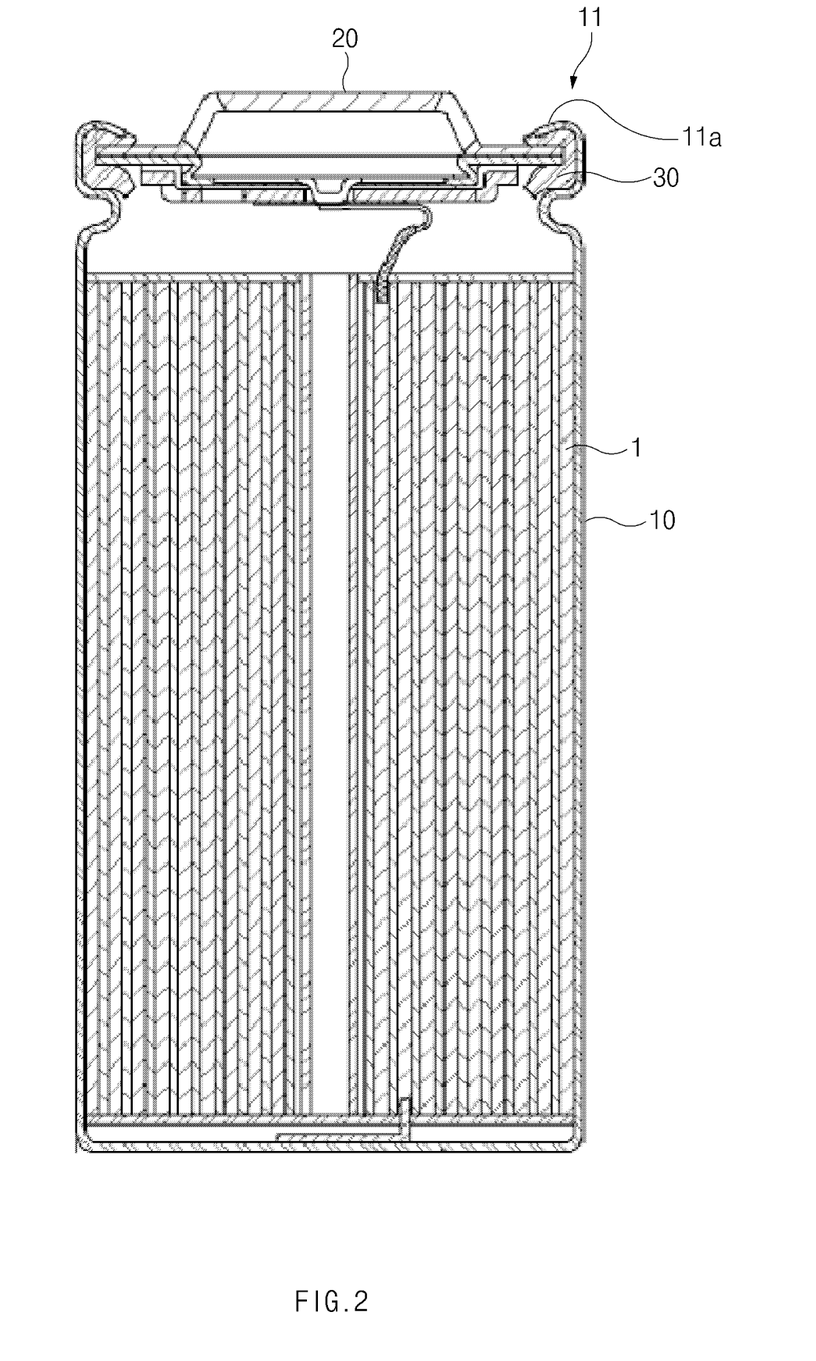
FIG. 2 is a cross-sectional view taken along line A-A of FIG. 1.
Figure 3:
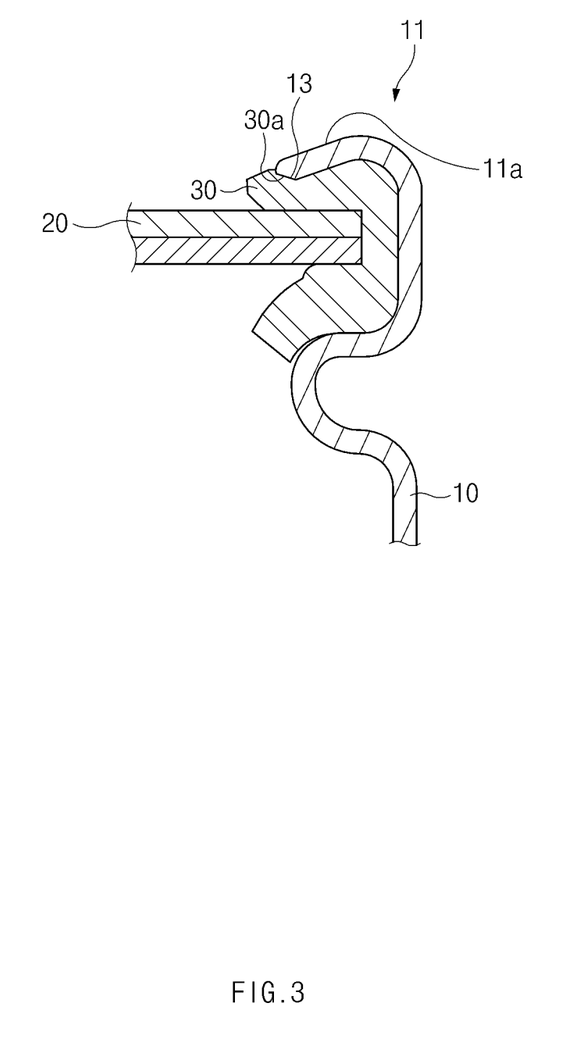
FIG. 3 is a partial enlarged view illustrating a main part of a gasket wrapping a fracture part of a can member in FIG. 2.

FIG. 1 is a perspective view of a secondary battery according to an embodiment of the present invention, FIG. 2 is a cross-sectional view taken along line A-A of FIG. 1, and FIG. 3 is a partial enlarged view illustrating a main part of a gasket wrapping a fracture part of a can member in FIG. 2.

Referring to FIGS. 1 to 3, a secondary battery according to an embodiment of the present invention includes a can member 10 defining an outer appearance of the secondary battery, a top cap assembly 20 sealing an opening 1 of the can member 10, a gasket 30 insulating the can member 10 from the top cap assembly 20, and a fracture part 13 disposed on an inner circumference of the opening 11.

The can member 10 may be a container made of a metal material and having a shape that is opened substantially upward in a cylindrical or prismatic type lithium ion secondary battery. The can member 10 may be made of aluminum (Al) which is light and easy to cope with corrosion.

Also, the can member 10 serves as a container for an electrode assembly 1 and an electrolyte. After the electrode assembly 1 is inserted into the can member 10 through the opened upper end of the can member 10, i.e., the opening defined in an upper end of the can member 10, the opening 11 defined in the upper end of the can member 10 is sealed by the top cap assembly 20.

The gasket 30 is made of an insulation material. An inner circumference of the gasket 30 is closely attached to the top cap assembly 20 to insulate the can member 10 and the top cap assembly 20 from each other, and an outer circumference of the gasket 30 is closely attached to the opening 11 of the can member 10.

Also, the can member 10 further include a crimping part 11a for bending an opening-side end that is the upper end of the can member 10 toward the gasket 30 to fix the top cap assembly 20 sealing the opening 11 of the can member 10.

Here, the gasket 30 may be installed between the opening 11 of the can member 10 and the top cap assembly 20 so as to be pressed and fixed to the can member 10 together with the top cap assembly 20 by using a crimping part 11a.

The fracture part 13 may be formed on the inner circumference of the end of the opening 11 by fracturing the opening 11 of the can member 10 while the can member 10 is manufactured.

The fracture part 13 may be closely attached to the gasket 30 by the crimping part 11a, and the gasket 30 may wrap the fracture part 13 disposed on the inner circumference of the end of the opening 11.

In addition, a recess part 30a that is recessed inward may be defined in the gasket 30. The fracture part 13 may be inserted into the recess part 30a and then be wrapped to be blocked from the outside by the gasket 30.

When the fracture part 13 that is likely to corrode when exposed to the outside is disposed on the inner circumference of the can member 10, the fracture part 13 is wrapped by the gasket 30 while the crimping part 11a bending the opening 11 of the can member 10 toward the gasket 30 is formed. Thus, the exposure of the fracture part 13 to the outside may be prevented without performing a separate additional process to the fracture part 13 from corroding.

Hereinafter, a method of manufacturing a secondary battery according an embodiment of the present invention will be described in detail with reference to the accompanying drawings.

Figure 4:
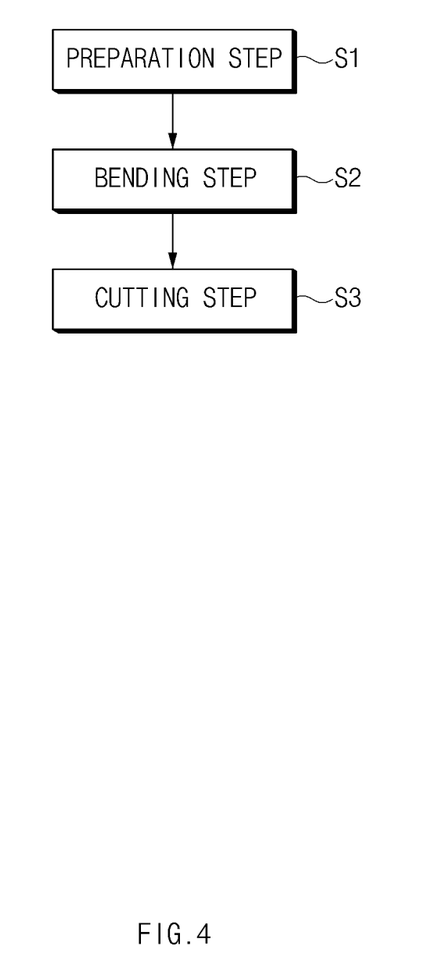
FIG. 4 is a flowchart illustrating a method for manufacturing a secondary battery according to an embodiment of the prevent invention.

FIG. 4 is a flowchart illustrating a method for manufacturing a secondary battery according to an embodiment of the prevent invention.

As illustrated in FIG. 4, a method for manufacturing a secondary battery according to an embodiment of the present invention includes a preparation step (S1), a bending step (S2), and a cutting step (S3).

The preparation step (s1) is a step of preparing a can member 10 of the secondary battery.

The bending step (S2) is a step of bending a cutoff part 11b to be cut from an opening 11 of the can member 10 inward.

Figure 5:
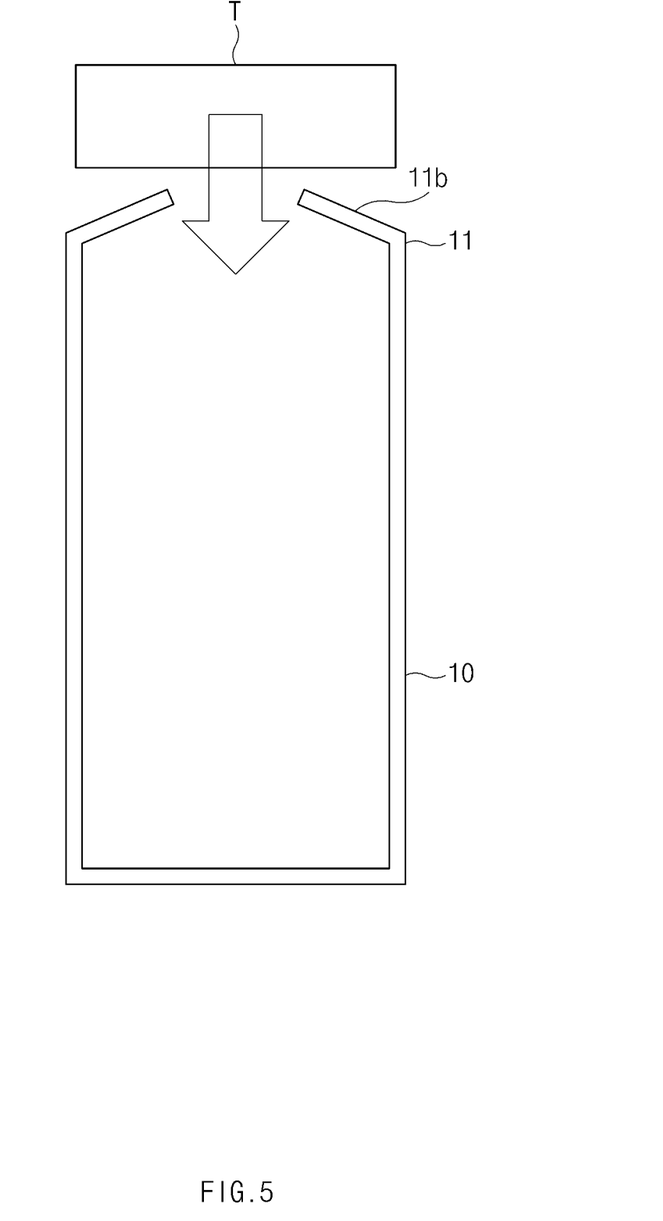
FIG. 5 is a view illustrating a use state before a trimming mold fractures an opening of the can member according to an embodiment of the present invention.
Figure 6:
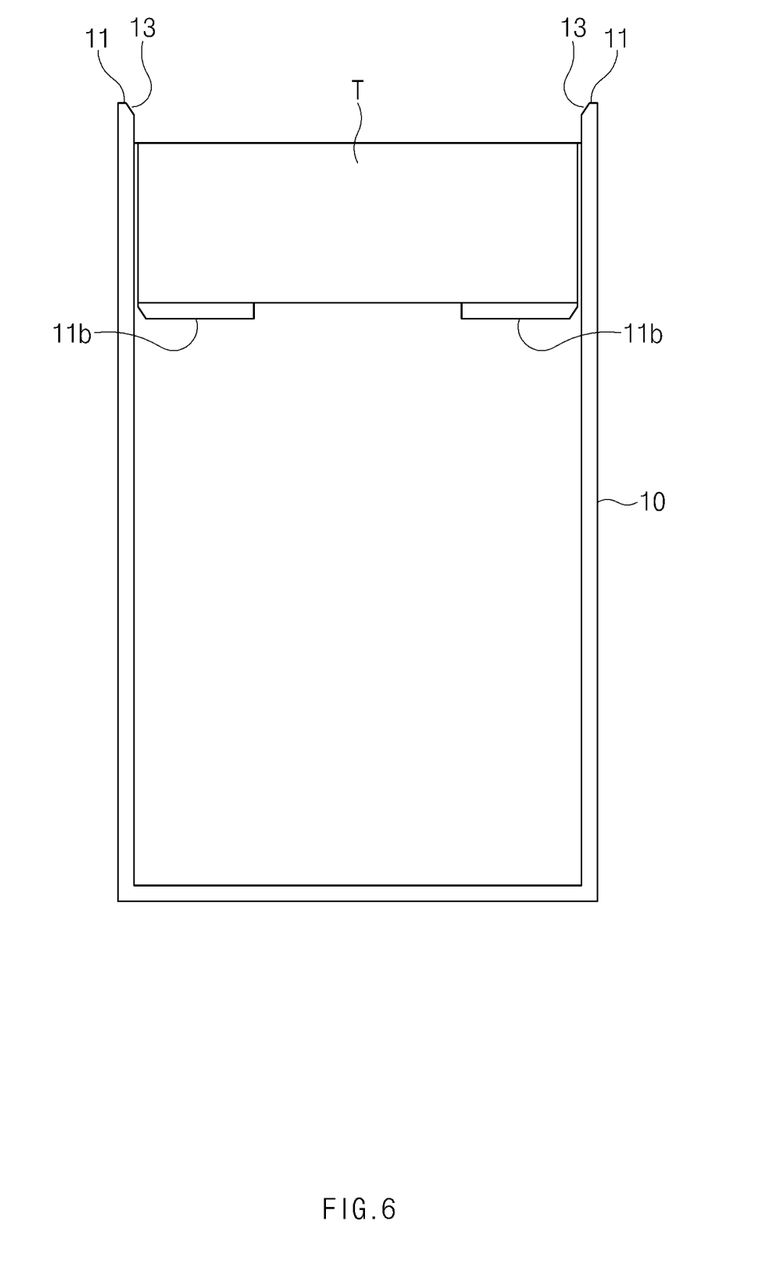
FIG. 6 is a view illustrating a use state after the trimming mold fractures the opening of the can member in FIG. 5.

FIG. 5 is a view illustrating a use state before a trimming mold fractures the opening of the can member according to an embodiment of the present invention, and FIG. 6 is a view illustrating a use state after the trimming mold fractures the opening of the can member in FIG. 5.

As illustrated in FIGS. 5 and 6, the cutting step (S3) is a step of allowing a trimming mold T to pass through the opening 11 in a state in which the cutoff part 11b is bent inward after the bending step (S2) and move to the inside of the can member 10 and thereby to cut the cutoff part 11b from the can member 10 by using the trimming mold T.

Thus, a fracture part 13 formed by cutting the cutoff part 11b from the can member 10 may be formed on an inner circumference of an end of the opening 11 of the can member 10.

Here, the trimming mold T may have an outer circumference equal to or less than the inner circumference of the can member 10.

Also, the outer circumference of the trimming mold T may have the same shape as that of the inner circumference of the can member 10 so that the trimming mold T is inserted into the can member 10.

When the trimming mold T is inserted into the can member 10, the cutoff part 11b formed on the opening 11 of the can member 10 may be cut by the trimming mold T.

After the cutting step (S3), an electrolyte and an electrode assembly are accommodated in the can member 10, and a top cap assembly 20 is installed on the opening 11 of the can member 10 to seal the opening 11 of the can member 10.

Also, a gasket 30 is installed between the top cap assembly 20 and the can member 10 to insulate the can member 10 and the top cap assembly 20 from each other.

The gasket 30 wraps the fracture part 13 to prevent the fracture part 13 from being exposed to the outside, thereby preventing the fracture part 13 from corroding.

According to the present invention, the fracture part of the can member may be prevented from being exposed to the outside to prevent the corrosion from occurring.

According to the present invention, the fracture part may be formed on the circumference of the inside of the opening while the trimming process is performed on the can member and then completely wrapped by the gasket in the crimping process of the can member without performing a separate additional process to prevent the cutoff part from being exposed.

Although the secondary battery and the method for manufacturing the same according to the present invention has been described above with reference to the exemplary drawings, various changes and modifications may be made thereto by one skilled in the art without departing from the scope and spirit of the invention as set forth in the appended claims.

What is claimed is:

1. A method for manufacturing a secondary battery, the method comprising:
    a preparation step of preparing a can member of the secondary battery;
    a bending step of bending a cutoff part inward from an opening of the can member; and
    a cutting step of allowing a trimming mold to pass through the opening and cut the cutoff part so that a fracture part of the opening is formed on an inner circumference of the opening,
    wherein the trimming mold has an outer circumference equal to or less than the inner circumference of the can member.

2. The method of claim 1, wherein, after the cutting step, an electrolyte and an electrode assembly are accommodated in the can member.

3. The method of claim 2, wherein a top cap assembly is installed on the opening of the can member in which the electrolyte and the electrode and the electrode assembly are accommodated.

4. The method of claim 3, wherein a gasket is installed between the can member and the top cap assembly to insulate the can member and the top cap assembly from each other.

5. The method of claim 4, wherein the gasket wraps the fracture part to prevent the fracture part from being exposed to the outside.

* * * * *